(12) United States Patent
Miyazaki

(10) Patent No.: US 9,268,108 B2
(45) Date of Patent: Feb. 23, 2016

(54) LENS BARREL CAPABLE OF SUPPRESSING VARIATION OF ATTITUDE OF OPTICAL ELEMENT AND IMAGE PICKUP APPARATUS USING THE SAME

(71) Applicant: CANON KABUSHIKI KAISHA, Tokyo (JP)

(72) Inventor: Takashi Miyazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 14/138,695

(22) Filed: Dec. 23, 2013

(65) Prior Publication Data

US 2014/0185152 A1 Jul. 3, 2014

(30) Foreign Application Priority Data

Dec. 27, 2012 (JP) ................. 2012-285168

(51) Int. Cl.
*G02B 7/02* (2006.01)
*G02B 7/10* (2006.01)

(52) U.S. Cl.
CPC ............... *G02B 7/023* (2013.01); *G02B 7/102* (2013.01); *G02B 7/10* (2013.01)

(58) Field of Classification Search
USPC ......................................... 359/819, 822, 823
See application file for complete search history.

(56) References Cited

U.S. PATENT DOCUMENTS 7,199,950 B2  4/2007  Sasaki

FOREIGN PATENT DOCUMENTS

| CN | 102540390 A | 7/2012 |
|----|-------------|--------|
| JP | 2012-078585 A | 4/2012 |
| JP | 2012-194265 A | 10/2012 |

OTHER PUBLICATIONS

Aug. 25, 2015 Chinese Office Action, issued in Chinese Patent Application No. 201310725935.1.

*Primary Examiner* — Jack Dinh
(74) *Attorney, Agent, or Firm* — Cowan, Liebowitz & Latman, P.C.

(57) ABSTRACT

A lens barrel enables to improve the optical performance thereof while realizing size reduction, structure simplification, and cost reduction in the lens barrel. A second group holding frame 21, in a collapsed state, is rotated with respect to the second group base plate 22 in a direction retracting from the optical axis A, and in a photographing state, is rotated toward the optical axis A. A compression spring 23 regulates an optical axis A direction position of the second group holding frame 21 with respect to the second group base plate 22 by urging, in the optical axis A direction, a portion of the second group holding frame 21. An engaging pin 22*d* and an engaging groove 21*e*, in the photographing state, regulate the optical axis A direction position of the second group holding frame 21 with respect to the second group base plate 22.

8 Claims, 10 Drawing Sheets

LENS BARREL CAPABLE OF SUPPRESSING VARIATION OF ATTITUDE OF OPTICAL ELEMENT AND IMAGE PICKUP APPARATUS USING THE SAME

BACKGROUND OF THE INVENTION

Field of the Invention

The present invention relates to a zoom type lens barrel mounted to an image pickup apparatus such as, for example, a digital camera and a digital video camera, and relates to an image pickup apparatus provided with the zoom type lens barrel.

As a zoom type lens barrel mounted to an image pickup apparatus, such as a digital camera and a digital video camera, there is a lens barrel provided with a retractable lens which is arranged on an optical axis at photographing time and which is retracted in the direction perpendicular to the optical axis at non-photographing time.

In the lens barrel of this type, the fitting length in the optical axis direction between a fitting hole portion of a holding member for holding the retractable lens and a support shaft fitted into the fitting hole portion is set to be long in order to suppress a variation in the attitude of the retractable lens. However, the configuration, in which the fitting length in the optical axis direction between the fitting hole portion of the holding member and the support shaft is set to be long, causes increase in the size of the lens barrel, and thus causes increase in the size of the image pickup apparatus.

Therefore, in order to avoid increase in the size of the lens barrel caused by the long fitting length, in Japanese Laid-Open Patent Publication (Kokai) No. 2012-78585, provides a technique in which, when the holding member is urged in the optical axis direction by a spring, the separation distance between a power point at which the urging force of the spring acts, and a fulcrum of inclination of the holding member is increased.

In this technique, urging force enough to prevent the holding member from being inclined by gravity is secured even by a small spring so as to suppress a variation in the attitude of the retractable lens, and the size of the spring is also reduced so as to prevent the size of the lens barrel from being increased.

However, in Japanese Laid-Open Patent Publication (Kokai) No. 2012-78585 described above, components, such as a cam and a rack, are needed in order to increase the separation distance between the power point at which the urging force of the spring acts, and the fulcrum of inclination of the holding member. As a result, the structure of the lens barrel is complicated, and also the number of components is increased, causing increase in the cost.

SUMMARY OF THE INVENTION

The present invention provides a lens barrel configured to improve the optical performance thereof by suppressing a variation in the attitude of a retractable optical element, while realizing size reduction, structure simplification, and cost reduction in the lens barrel, and also provides an image pickup apparatus provided with the lens barrel.

Accordingly, a first aspect of the present invention provides a lens barrel comprising a moving member configured to be moved along an optical axis according to a zooming operation, a holding member supported so as to be rotatable, via a support shaft, with respect to the moving member, in a state of holding an optical element, the holding member being configured, in a collapsed state, to be rotated in a direction retracting from the optical axis, and in a photographing state, to be rotated toward the optical axis to arrange the optical element on the optical axis, a first position regulating unit configured to regulate an optical-axis-direction position of the holding member with respect to the moving member by urging, in the optical axis direction, wherein a portion is supported by the moving member via the support shaft of the holding member, and a second position regulating unit provided between the moving member and the holding member, the second position regulating unit being configured, in the photographing state, to regulate the optical-axis-direction position of the holding member with respect to the moving member.

Accordingly, a second aspect of the present invention provides an image pickup apparatus including a lens barrel, wherein the lens barrel is comprised of a moving member configured to be moved in an optical axis according to a zooming operation, a holding member supported so as to be rotatable, via a support shaft, with respect to the moving member, in a state of holding an optical element, the holding member being configured, in a collapsed state, to be rotated in a direction retracting from the optical axis, and in a photographing state, to be rotated toward the optical axis to arrange the optical element on the optical axis, a first position regulating unit configured to regulate the optical-axis-direction position of the holding member with respect to the moving member by urging, in an optical axis direction, wherein a portion is supported by the moving member via the support shaft of the holding member, and a second position regulating unit provided between the moving member and the holding member, the second position regulating unit being configured, in the photographing state, to regulate the optical-axis-direction position of the holding member with respect to the moving member.

According to the present invention, it is possible to improve the optical performance of the lens barrel by suppressing a variation in the attitude of the retractable optical element, while realizing size reduction, structure simplification, and cost reduction in the lens barrel.

Further features of the present invention will become apparent from the following description of exemplary embodiments (with reference to the attached drawings).

DESCRIPTION OF THE EMBODIMENTS

In the following, embodiments according to the present invention will be described with reference to the accompanying drawings.

Figure 1:
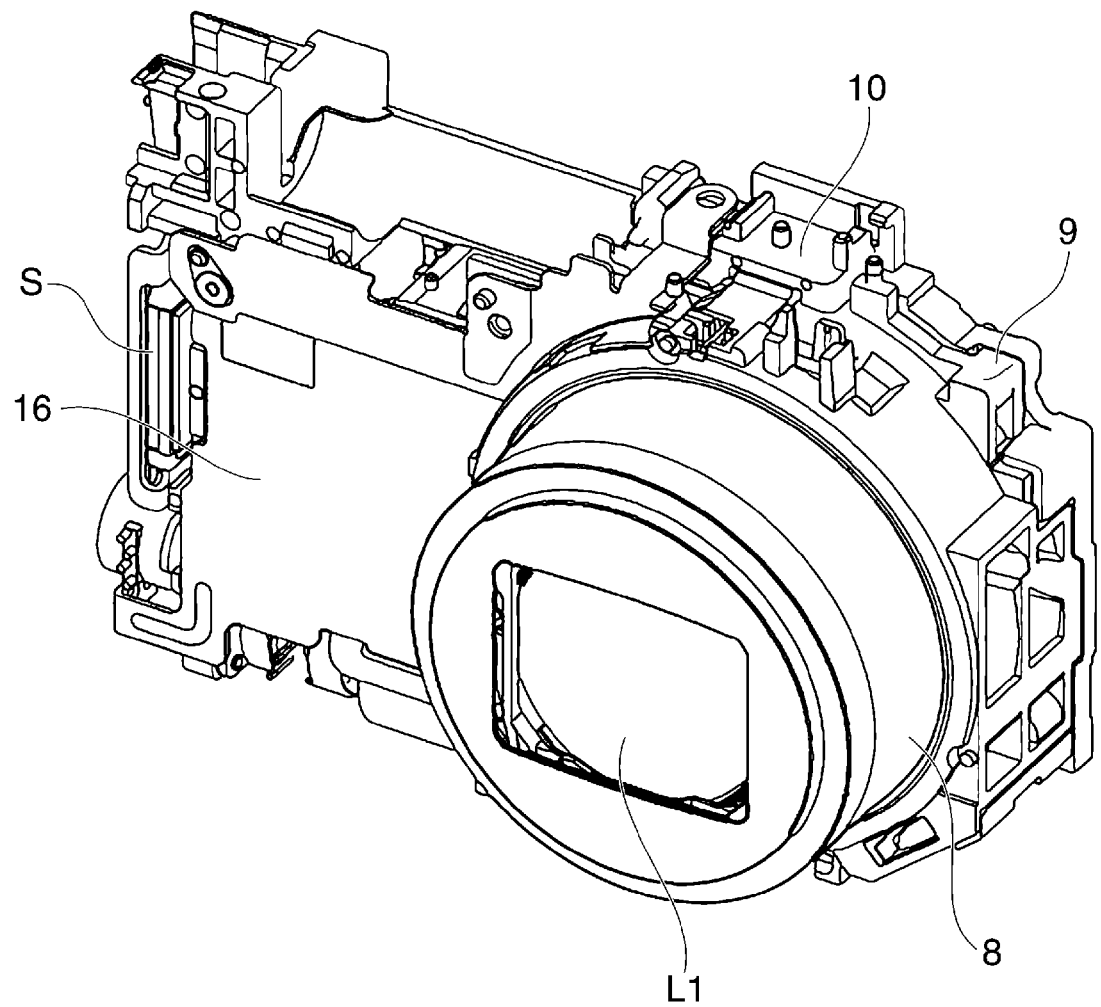
FIG. 1 is an external perspective view of a zoom type lens barrel which is a first embodiment of the present invention and seen from the front side (subject side) thereof.
Figure 2A:
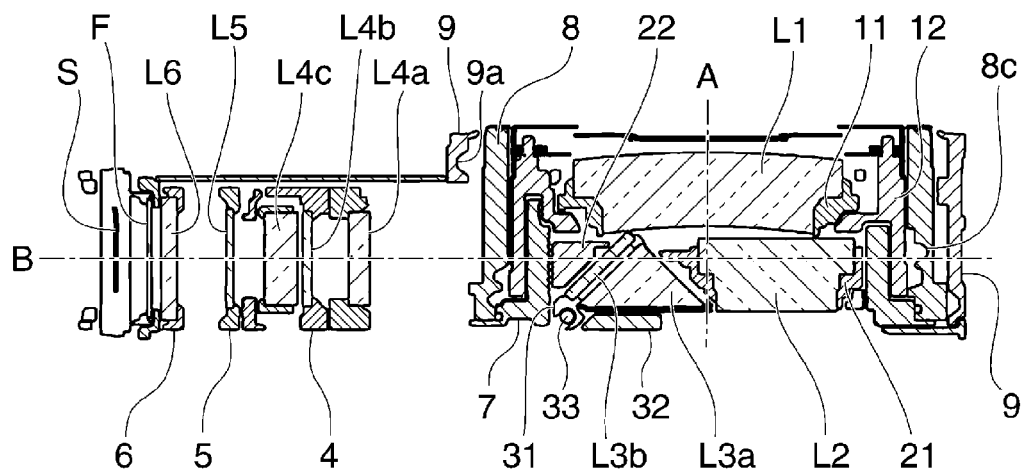
FIG. 2A is a cross-sectional view at the time when the lens barrel shown in FIG. 1 is in the collapsed position.
Figure 2B:
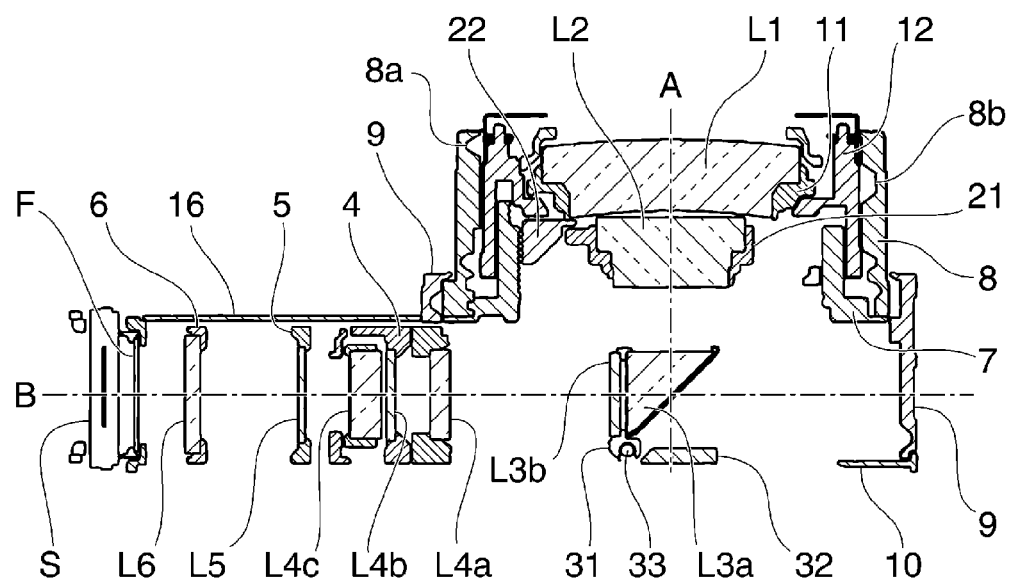
FIG. 2B is a cross-sectional view at the time when the lens barrel shown in FIG. 1 is in the photographing position.
Figure 3:
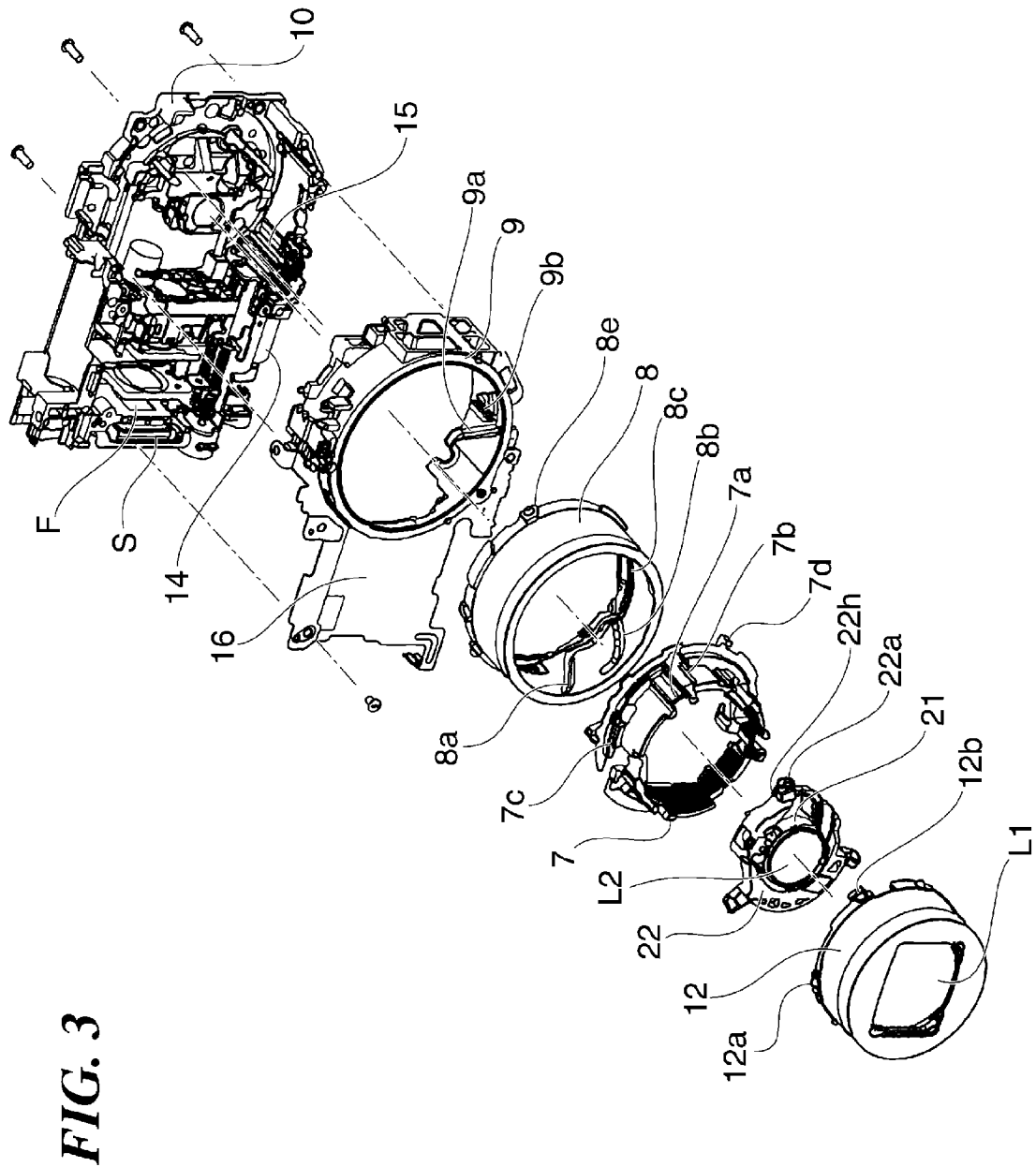
FIG. 3 is an exploded perspective view of the lens barrel shown in FIG. 1.

FIG. 1 is an external perspective view of a zoom type lens barrel according to a first embodiment of the present invention and seen from the front side (subject side) of the lens barrel. FIG. 2A is a cross-sectional view at the time when the lens barrel shown in FIG. 1 is in the collapsed position, and FIG. 2B is a cross-sectional view at the time when the lens barrel shown in FIG. 1 is in the photographing position. FIG. 3 is an exploded perspective view of the lens barrel shown in FIG. 1. It should be noted that, in the present embodiment, a zoom type lens barrel mounted to an image pickup apparatus, such as a digital camera, is taken as an example, but the present invention is not limited to this example.

As shown in FIG. 1 to FIG. 3, a lens barrel according to the present embodiment includes six photographing optical system groups composed of a first group lens L1, a second group lens L2, third group lenses L3a and L3b, fourth group lenses L4a, L4b and L4c, a fifth group lens L5, and a sixth group lens L6. The third group lens L3a is composed of a prism serving as a bending optical system in which a light flux incident in the direction of an optical axis A is guided in the direction of an optical axis B intersecting the optical axis A (substantially perpendicularly in FIG. 2A and FIG. 2B).

A first group holding frame 11 holds the first group lens L1 and is fixed to a first group lens barrel 12. On an outer peripheral portion of an image-surface-side end portion of the first group lens barrel 12, three cam pins 12a and three cam pins 12b are projectingly provided (at a total of six places) at predetermined intervals in the circumferential direction, respectively. The cam pin 12a engages with a cam groove 8a formed in an inner peripheral portion of a cam cylinder 8, and the cam pin 12b engages, with a slight gap, with a cam groove 8b formed in the inner peripheral portion of the cam cylinder 8.

Further, in the inner peripheral portions of the first group lens barrel 12, three linear movement keys (not shown) are respectively formed at predetermined intervals in the circumferential direction, and each of the linear movement keys engages with each of linear movement grooves 7a formed in the outer peripheral portions of a linear movement cylinder 7.

Figure 4:
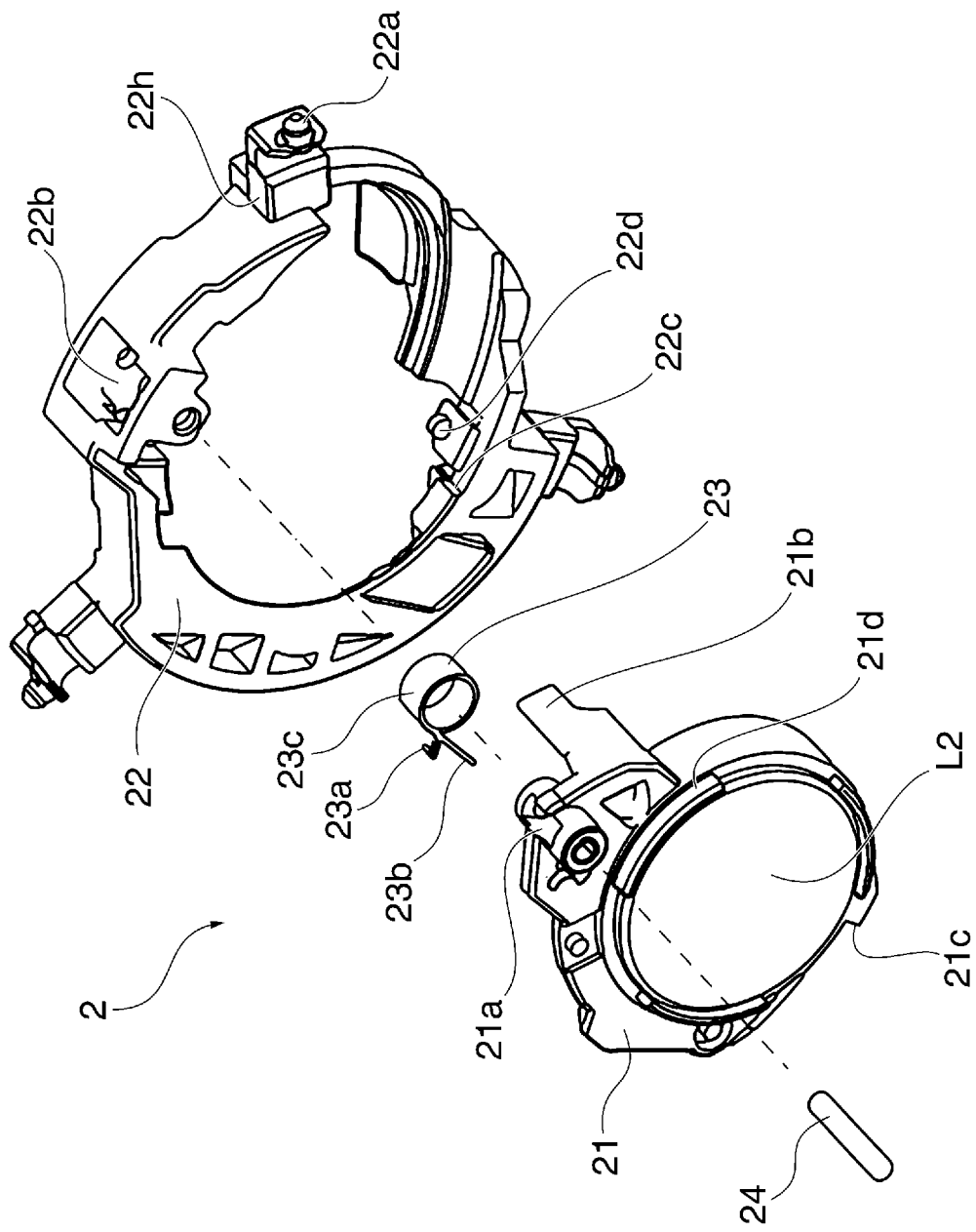
FIG. 4 is an exploded perspective view of a second group unit.
Figure 5A:
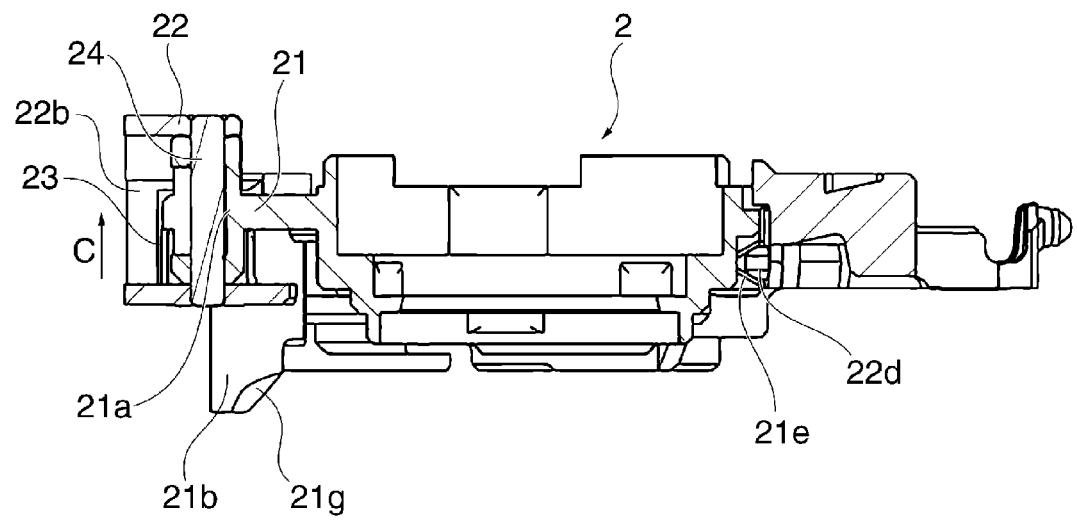
FIG. 5A is a cross-sectional view of the second group unit.
Figure 5B:
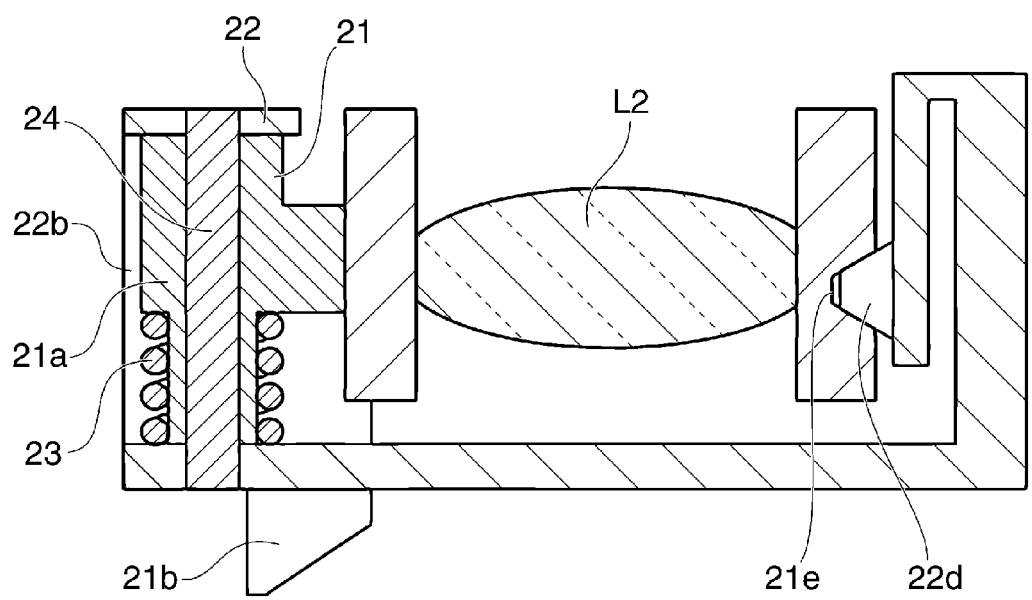
FIG. 5B is an enlarged schematic cross-sectional view of a main portion of FIG. 5A.
Figure 6A:
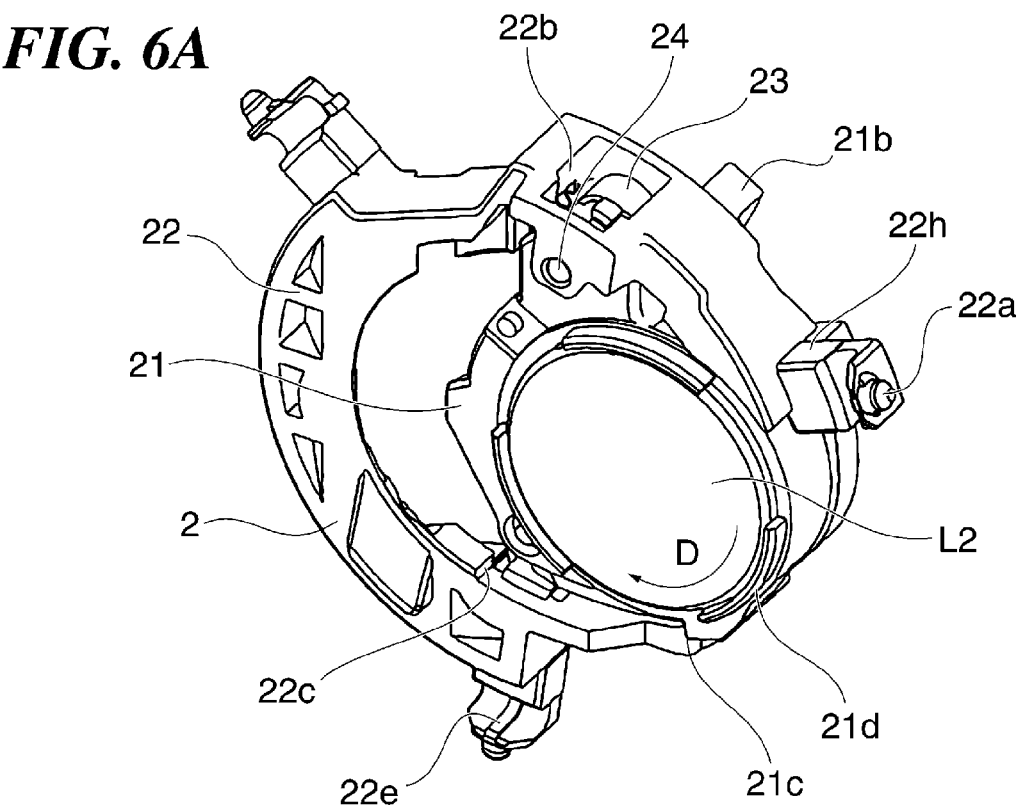
FIG. 6A is a perspective view of the second group unit in a non-photographing state.
Figure 6B:
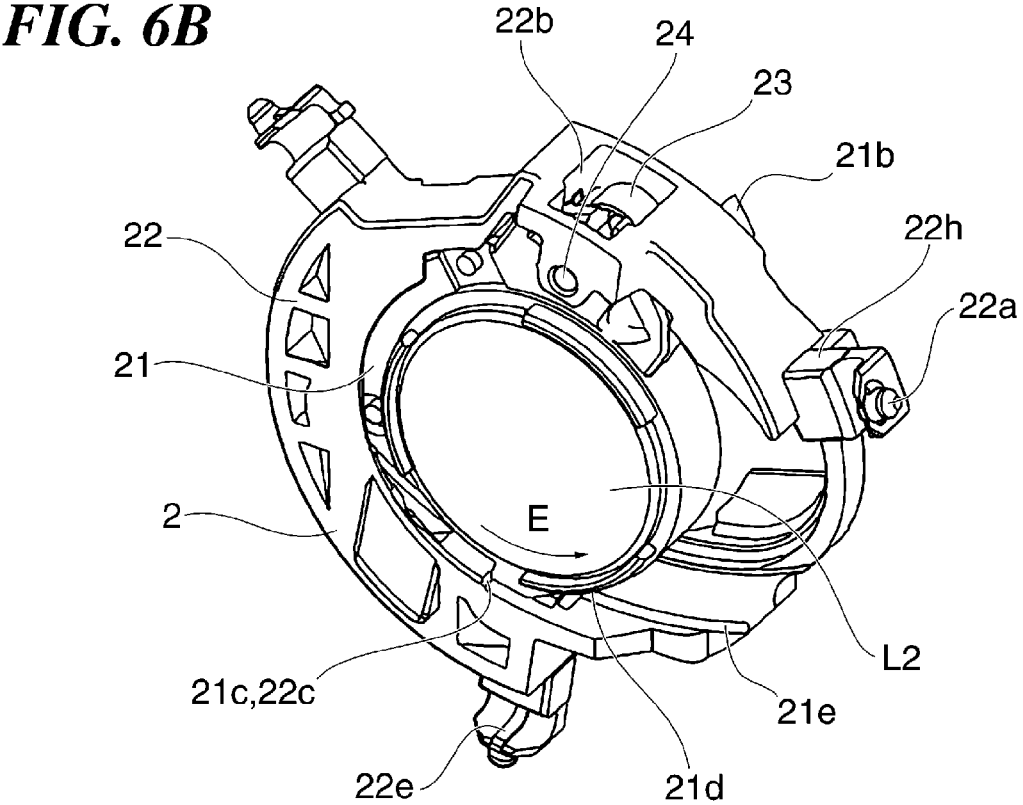
FIG. 6B is a perspective view of the second group unit in a photographing state.

FIG. 4 is an exploded perspective view of a second group unit 2. FIG. 5A is a cross-sectional view of the second group unit 2, and FIG. 5B is a schematic enlarged cross-sectional view of a main portion of FIG. 5A. FIG. 6A is a perspective view of the second group unit 2 in a non-photographing state, and FIG. 6B is a perspective view of the second group unit 2 in a photographing state.

As shown in FIG. 4 to FIG. 6B, a second group holding frame 21 holds the second group lens L2 and is fixed to a second group base plate 22. When the second group holding frame 21 is fixed to the second group base plate 22, as shown in FIG. 5A and FIG. 5B, a sleeve 21a provided on the outer peripheral side of the second group holding frame 21 is inserted into an opening section 22b of the second group base plate 22 so as to be rotatably supported by a support shaft 24, so that the second group holding frame 21 is rotatably supported by the second group base plate 22. Here, the second group lens L2 corresponds to an example of an optical element in the present invention. Further, the second group base plate 22 corresponds to an example of a moving member in the present invention, and the second group holding frame 21 corresponds to an example of a holding member in the present invention.

A coil section 23c of a compression spring 23 fitted to the sleeve 21a of the second group holding frame 21 urges, in the arrow C direction (optical axis A direction) of FIG. 5A, a portion of the second group holding frame 21, the portion being stored in the opening section 22b of the second group base plate 22, that is, supported by the second group base plate 22 via the support shaft 24.

By this urging action, play between the second group holding frame 21 and the second group base plate 22 in the optical axis A direction is overcame, so that the position of the second group holding frame 21 is regulated in the optical axis A direction. Here, the compression spring 23 corresponds to an example of a first position regulating unit in the present invention.

As shown in FIG. 4, in the present embodiment, the compression spring 23 is composed of a torsion spring, and two arm sections 23a and 23b of the compression spring 23 are respectively hung by a hook (not shown) of the second group holding frame 21 and in a hole portion (not shown) of the second group base plate 22. Thereby, by the function of the torsion spring of the compression spring 23, force in the rotation direction perpendicular to the optical axis A is applied to the second group holding frame 21 as shown by the arrow D in FIG. 6A, so that the second group holding frame 21 is rotated toward the photographing position shown in FIG. 6B.

When the second group holding frame 21 is rotated to reach the photographing position on the optical axis A shown in FIG. 6B, a rotation regulating surface 21c formed on the second group holding frame 21 is brought into contact with a rotation regulating surface 22c of the second group base plate 22. Thereby, the second group holding frame 21 is prevented from being rotated and is held at the photographing position.

Further, a retraction drive section 21b is formed in the vicinity of the sleeve 21a of the second group holding frame 21. At non-photographing time (in the collapsed state of the lens barrel), the retraction drive section 21b is brought into contact with a retraction drive section 10a (see FIG. 8A to FIG. 10B) formed at a fixed base plate 10. Thereby, the second group holding frame 21 is rotated in the arrow E direction shown in FIG. 6B, so as to be arranged at a non-photographing position shown in FIG. 6A.

As described above, at the time of zooming operation of the lens barrel, the center of the second group lens L2 held by the second group holding frame 21 is arranged on the optical axis A in the photographing state, while in the non-photographing state (collapsed state), the center of the second group lens L2 is arranged at the position retracted in the direction perpendicular to the optical axis A.

Returning to FIG. 3, three cam pins 22a are projectingly provided at outer peripheral portions of the second group base plate 22 at predetermined intervals in the circumferential direction. The cam pin 22a engages with a cam groove 8c formed in an inner peripheral portion of the cam cylinder 8. Further, a linear movement key 22h is formed at the same place as the cam pin 22a of the second group base plate 22. The linear movement key 22h engages with a linear movement groove 7b formed in the linear movement cylinder 7.

A plurality of projecting sections 7c are respectively formed at outer peripheral portions of the image-surface-side end portion of the linear movement cylinder 7 at predetermined intervals in the circumferential direction. The projecting section 7c engages with a groove section (not shown) formed in the inner peripheral surface of the image-surface-side end portion of the cam cylinder 8. The cam cylinder 8 is supported so as to be rotatable with respect to the linear movement cylinder 7 and is moved integrally with the linear movement cylinder 7 in the optical axis A direction. Further, three cam pins 8e are respectively formed at outer peripheral portions of the image-surface-side end portion of the cam cylinder 8 at predetermined intervals in the circumferential direction. The cam pin 8e engages with a cam groove 9a formed in the inner peripheral portion of a fixed cylinder 9.

The linear movement cylinder 7 supports the first group lens barrel 12 and the second group base plate 22 in a state where the first group lens barrel 12 and the second group base plate 22 are prevented from being rotated. Further, four linear movement keys 7d are provided at outer peripheral portions of the image-surface-side end portion of the linear movement cylinder 7 at predetermined intervals in the circumferential direction. The linear movement key 7d engages with a linear movement groove 9b formed in the inner peripheral portion of the fixed cylinder 9.

A DC motor 14 configures a driving device which rotationally drives the cam cylinder 8 via a gear train 15. The output gear of the gear train 15 is in mesh with a gear portion (not shown) formed in an outer peripheral portion of the image-surface-side end portion of the cam cylinder 8. Thereby, the output force of the driving device is transmitted to the cam cylinder 8 via the gear train 15, so as to rotationally drive the cam cylinder 8.

When the cam cylinder 8 is rotationally driven by the output force of the driving device via the gear train 15, the cam cylinder 8 is moved in the optical axis A direction while being rotated due to the interaction caused by the cam pin 8e of the cam cylinder 8 and the cam groove 9a of the fixed cylinder 9.

Further, due to the interaction caused by the cam pin 12a of the first group lens barrel 12 and the cam groove 8a of the cam cylinder 8, and due to the interaction caused by a linear movement key (not shown) of the first group lens barrel 12 and the linear movement groove 7a of the linear movement cylinder 7, the first group lens barrel 12 is moved in the optical axis A direction while being prevented from being rotated.

Due to the interaction caused by the cam pin 22a and the cam groove 8c of the cam cylinder 8, and due to the interaction caused by the linear movement key 22h of the second group base plate 22 and the linear movement groove 7b of the linear movement cylinder 7, the second group base plate 22 is moved in the optical axis A direction while being prevented from being rotated.

As shown in FIG. 2A and FIG. 2B, a third group holding frame 31 holds the third group lenses L3a and L3b. A shaft hole portion (not shown) formed in a third group holding frame 31 is positioned, via an engaging shaft 33, on the same axis as a shaft hole portion (not shown) formed in a third group base plate 32. The third group holding frame 31 is supported so as to be rotatable about the engaging shaft 33 with respect to the third group base plate 32 in a range of about 45°.

Further, at photographing time, the third group holding frame 31 is urged by a torsion spring (not shown) so that the third group lens L3a is arranged at the image-surface-side position (photographing position) of the second group lens L2, at which position the light flux incident in the optical axis A direction is guided, by the third group lens L3a, in the optical axis B direction perpendicular to the optical axis A direction (see FIG. 2B).

Further, at non-photographing time, the third group holding frame 31 is rotated by the linear movement cylinder 7 and is thereby moved from the position at photographing time to the image surface side along the optical axis B in the state of being rotated about 45° in the clockwise direction in FIG. 2B. As a result, the third group holding frame 31 is stored in the radial-direction outer space of the retracted second group lens L2 (see FIG. 2A).

A fourth group unit 4 is composed of a shutter IS unit and holds the fourth group lenses L4a, L4b and L4c. The fourth group unit 4 engages with a support shaft (not shown) in parallel with the optical axis B and is thereby supported so as to be movable in the optical axis B direction.

A fifth group holding frame 5 holds the fifth group lens L5. The fifth group holding frame 5 engages with a support shaft (not shown) in parallel with the optical axis B and is thereby supported so as to be movable in the optical axis B direction.

A sixth group holding frame 6 holds the sixth group lens L6. The sixth group holding frame 6 engages with a support shaft (not shown) in parallel with the optical axis B and is thereby supported so as to be movable in the optical axis B direction.

Further, an image pickup element S and an optical filter F are held at the fixed base plate 10. The fixed cylinder 9 and a cover 16 are fixed to the fixed base plate 10 with screws (not shown).

In the lens barrel of the present embodiment, during the collapsing operation, the sixth group holding frame 6 is first moved to the image surface side along the optical axis B, and then the fourth group unit 4 is moved along the optical axis B while pushing the fifth group holding frame 5 to the image surface side.

Then, the first group lens barrel 12, the second group base plate 22, the linear movement cylinder 7, and the cam cylinder 8 are retracted along the optical axis A by the rotation of the cam cylinder 8. The third group holding frame 31 starts to rotate according to the retracting operation of the linear movement cylinder 7 and is stored in the state of being rotated by 45° (in the state of FIG. 2A).

On the contrary, during the photographing operation, the first group lens barrel 12, the second group holding frame 21, the linear movement cylinder 7, and the cam cylinder 8 are moved to the subject side along the optical axis A. According to this operation, the third group holding frame 31 is rotated by 45° in the direction reverse to the rotation direction during the collapsing operation so as to be held in the state of FIG. 2B. Further, the fourth group unit 4, the fifth group holding frame 5, and the sixth group holding frame 6 are respectively moved to the predetermined positions along the optical axis B.

Next, the operation of the second group unit 2 will be described in detail with reference to FIG. 5A to FIG. 10B.

Figure 7:
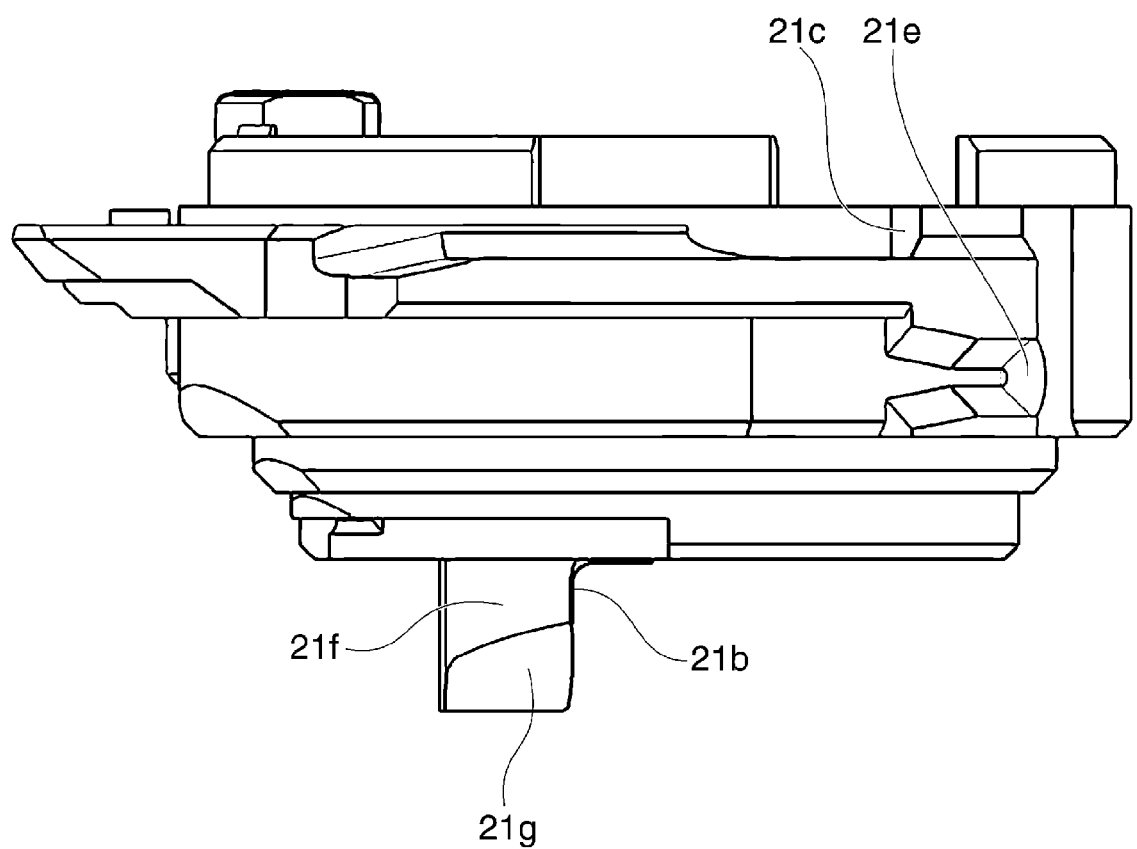
FIG. 7 is a side view of a second group holding frame.
Figure 8A:
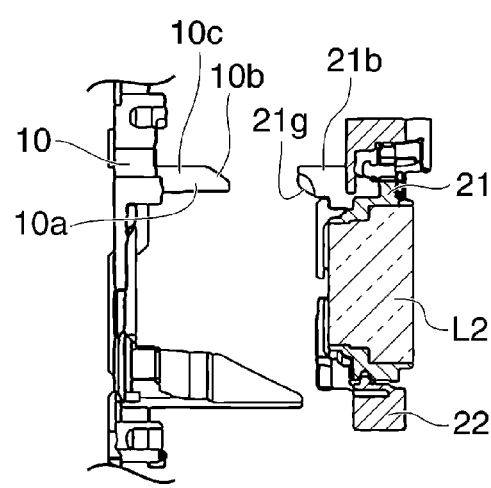
FIG. 8A is a view showing a relationship between the second group unit and a fixed base plate in the photographing position.
Figure 8B:
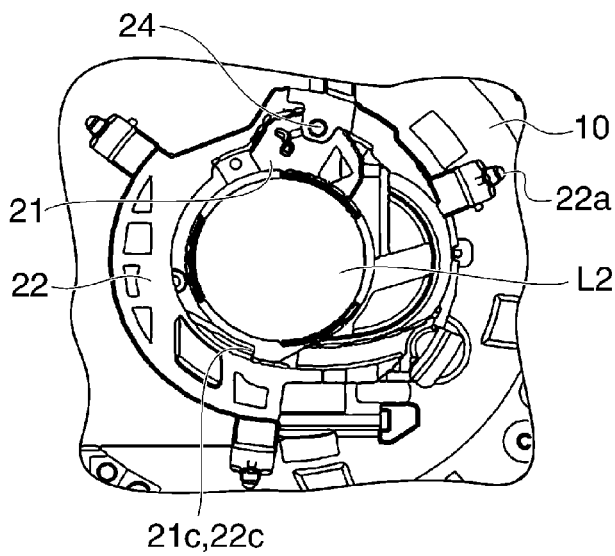
FIG. 8B is a right side view of FIG. 8A.
Figure 9A:
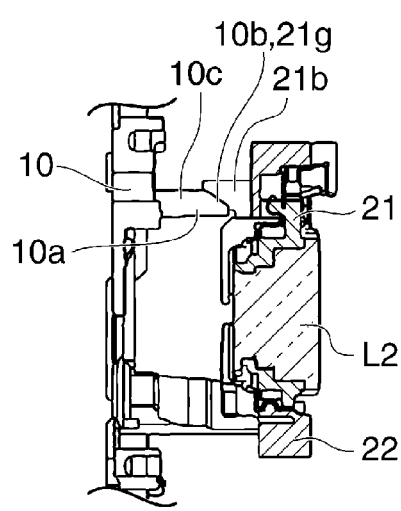
FIG. 9A is a view showing a relationship between the second group unit and the fixed base plate during retraction of the second group holding frame.
Figure 9B:
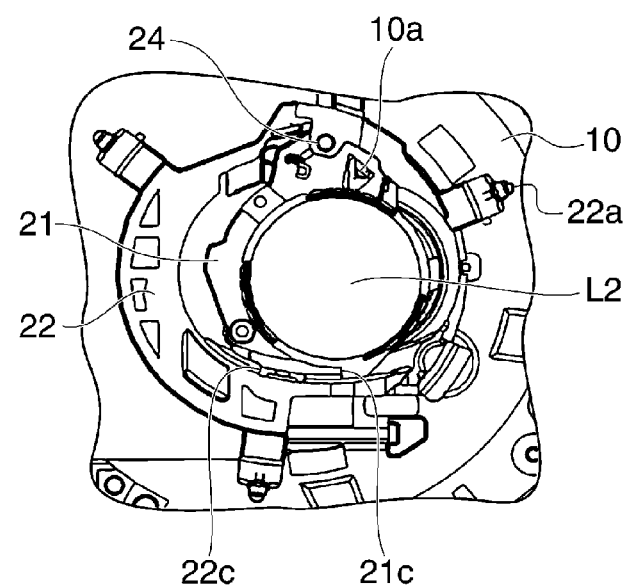
FIG. 9B is a right side view of FIG. 9A.
Figure 10A:
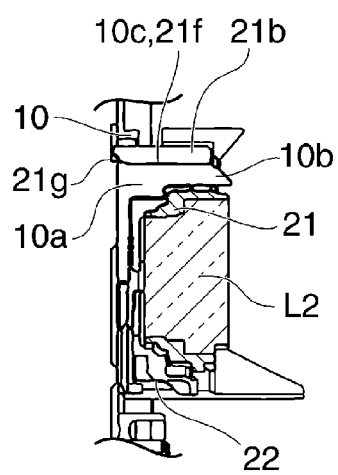
FIG. 10A is a view showing a relationship between the second group unit and the fixed base plate in a non-photographing position.
Figure 10B:
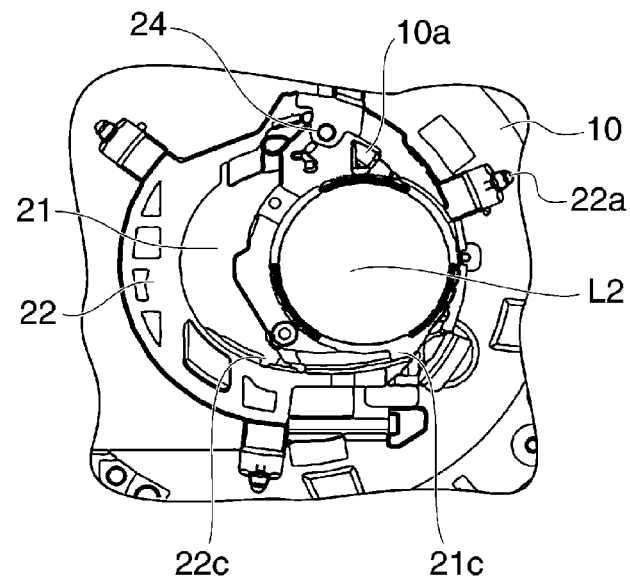
FIG. 10B is a right side view of FIG. 10A.

FIG. 7 is a side view of the second group holding frame 21.
FIG. 8A is a view showing a relationship between the second group unit 2 and the fixed base plate 10 in the photographing position, and FIG. 8B is a right side view of FIG. 8A. FIG. 9A is a view showing a relationship between the second group unit 2 and the fixed base plate 10 during retraction of the second group holding frame 21, and FIG. 9B is a right side view of FIG. 9A. FIG. 10A is a view showing a relationship between the second group unit 2 and the fixed base plate 10 in the non-photographing position, and FIG. 10B is a right side view of FIG. 10A.

First, the rotational operation of the second group holding frame 21 of the second group unit 2 from the photographing position to the non-photographing position will be described. When the second group holding frame 21 is rotated from the photographing position shown in FIG. 8A and FIG. 8B to the non-photographing position shown in FIG. 10A and FIG. 10B, the second group holding frame 21 is retracted in the optical axis A direction so as to follow the cam cylinder 8. At this time, as shown in FIG. 9A and FIG. 9B, an inclined surface section 21g of the retraction drive section 21b of the second group holding frame 21 is pressed against an inclined surface section 10b provided at the retraction drive section 10a of the fixed base plate 10.

By this pressing, the second group holding frame 21 is rotated in the arrow E direction of FIG. 6B while charging the arm sections 23a and 23b of the compression spring 23 about the support shaft 24. Thereby, the second group lens L2 held at the second group holding frame 21 is retracted from the optical axis A.

Then, a rotation regulating surface 21f formed at the retraction drive section 21b of the second group holding frame 21 is brought into contact with a rotation regulating surface 10c formed at the retraction drive section 10a of the fixed base plate 10, so that the rotation of the second group holding frame 21 is regulated (see FIG. 10A).

Further, when the inclined surface section 21g of the retraction drive section 21b of the second group holding frame 21 is brought into contact with the inclined surface section 10b provided at the retraction drive section 10a of the fixed base plate 10, the second group holding frame 21 is urged in the optical axis A direction by the coil section 23c of the compression spring 23. By this urging force, the fitting play in the optical axis A direction between the support shaft 24 and the opening section 22b of the second group base plate 22 shown in FIG. 5A and FIG. 5B is absorbed, so that the second group holding frame 21 is prevented from being inclined.

Next, when the second group holding frame 21 of the second group unit 2 is rotated from the non-photographing position shown in FIG. 10A and FIG. 10B to the photographing position shown in FIG. 8A and FIG. 8B, the second group holding frame 21 is moved to the subject side in the optical axis A direction so as to follow the cam cylinder 8.

When the second group holding frame 21 is moved to the subject side in the optical axis A direction, the rotation regulating surface 21f formed at the retraction drive section 21b of the second group holding frame 21 is separated from the rotation regulating surface 10c formed at the retraction drive section 10a of the fixed base plate 10, so that the regulation of rotation of the second group holding frame 21 is released.

At this time, the urging force is exerted on the second group holding frame 21 in the arrow D direction in FIG. 6A about the support shaft 24 by the compression spring 23, the arm sections 23a and 23b of which are charged about the support shaft 24. Thereby, the second group holding frame 21 is rotated in the arrow D direction in FIG. 6A, so that the center of the second group lens L2 is arranged on the optical axis A. At this time, the rotation regulating surface 21c of the second group holding frame 21 is brought into contact with the rotation regulating surface 22c of the second group base plate 22, so that the second group holding frame 21 is positioned.

Here, as shown in FIG. 5A and FIG. 5B, an engaging groove 21e is provided at a position of the second group holding frame 21, the position substantially facing, via the optical axis A, the compression spring 23 urging the opening section 22b of the second group base plate 22 in the arrow C direction (optical axis A direction) in FIG. 5A. Further, an engaging pin 22d, which is detachably engaged with the engaging groove 21e, is provided at a position of the second group base plate 22, the position corresponding to the engaging groove 21e.

When the second group holding frame 21 is rotated from the non-photographing position to the photographing position, the engaging groove 21e engages with the engaging pin 22d during movement of the lens barrel. This engagement state is maintained during movement of the second group holding frame 21 from a position at which the engaging groove 21e engages with the engaging pin 22d to the photographing position. Thereby, the position of the second group holding frame 21 with respect to the second group base plate 22 in the optical axis A direction is regulated.

Further, the engaging groove 21e of the second group holding frame 21 is configured to have a taper-shaped cross-section expanding toward the radial direction outer side (toward the side of the engaging pin 22d). Therefore, even when, while the lens barrel is moved, the second group holding frame 21 is inclined slightly with respect to the optical axis A direction, the engaging groove 21e is guided by the engaging pin 22d of the second group base plate 22 so as to engage with the engaging pin 22d.

Further, the engaging pin 22d of the second group base plate 22 has a spring property. Therefore, due to engaging with the engaging groove 21e, the engaging pin 22d also urges the second group holding frame 21 in the direction perpendicular to the optical axis A, so as to regulate the position of the second group holding frame 21 in the direction perpendicular to the optical axis A direction. Here, the engaging pin 22d and the engaging groove 21e correspond to an example of a second position regulating unit in the present invention. Further, the engaging groove 21e corresponds to an example of a concave shape of a concave and convex engaging structure in the present invention, and the engaging pin 22d corresponds to an example of a convex shape of the concave and convex engaging structure in the present invention. It should be noted that an engaging pin may be provided at the second group holding frame 21, and an engaging groove may also be provided at the second group base plate 22.

As described above, in the present embodiment, the position of the second group holding frame 21 is regulated in the optical axis A direction in the photographing state by means of both the urging force of the coil section 23c of the compression spring 23 and the engagement between the engaging groove 21e and the engaging pin 22d, which are located in a substantially opposing manner with the optical axis A inbetween.

Thereby, even when the fitting length between the sleeve 21a of the second group holding frame 21 and the support shaft 24 is short, the second group holding frame 21 is positionally regulated in the optical axis A direction by the engagement between the engaging groove 21e and the engaging pin 22d, and hence a variation in the attitude of the second group lens L2 can be suppressed. As a result, by the effect of suppressing the variation in the attitude of the second group lens L2, it is possible to improve the optical performance of the lens barrel, while reducing the size of the lens barrel and also the size of the digital camera.

Further, since, in the present embodiment, components, such as a cam and a rack, which are conventionally required, are not required, the structure of the lens barrel is simplified, and also the cost of the lens barrel can be reduced due to reducing the number of components.

Further, in the present embodiment, even when an impact force is applied to the lens barrel due to the falling-off, or the like, of the digital camera, or the like, the two position regulating sections, which regulate the position of the second group lens L2 in the optical axis A direction, absorb the impact force to prevent the second group lens L2 from being shifted, and hence the photographing can be performed without deterioration of the optical accuracy.

Next, a lens barrel according to a second embodiment of the present invention will be described with reference to FIG. 11 to FIG. 12B.

Figure 11:
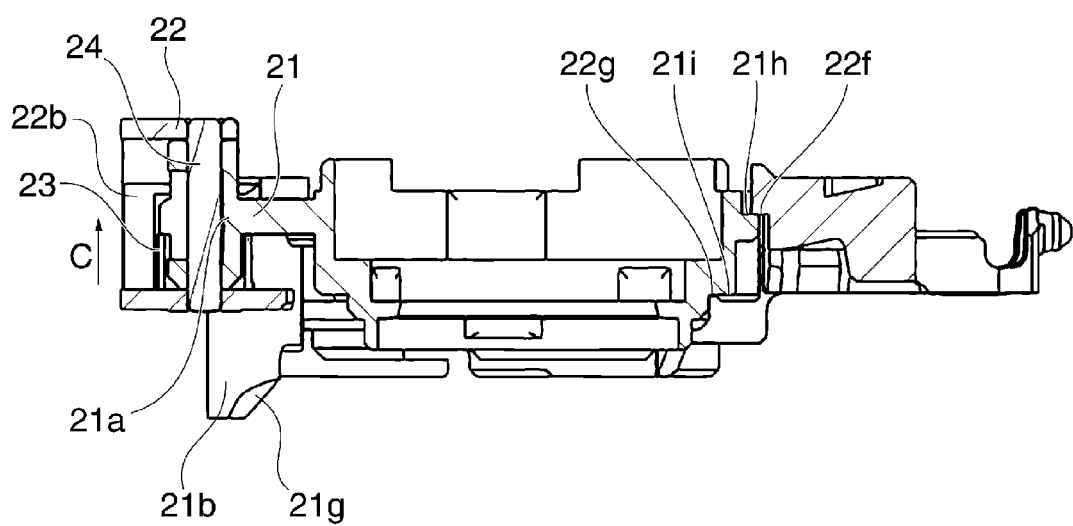
FIG. 11 is a cross-sectional view of a second group unit in a lens barrel which is a second embodiment of the present invention.
Figure 12A:
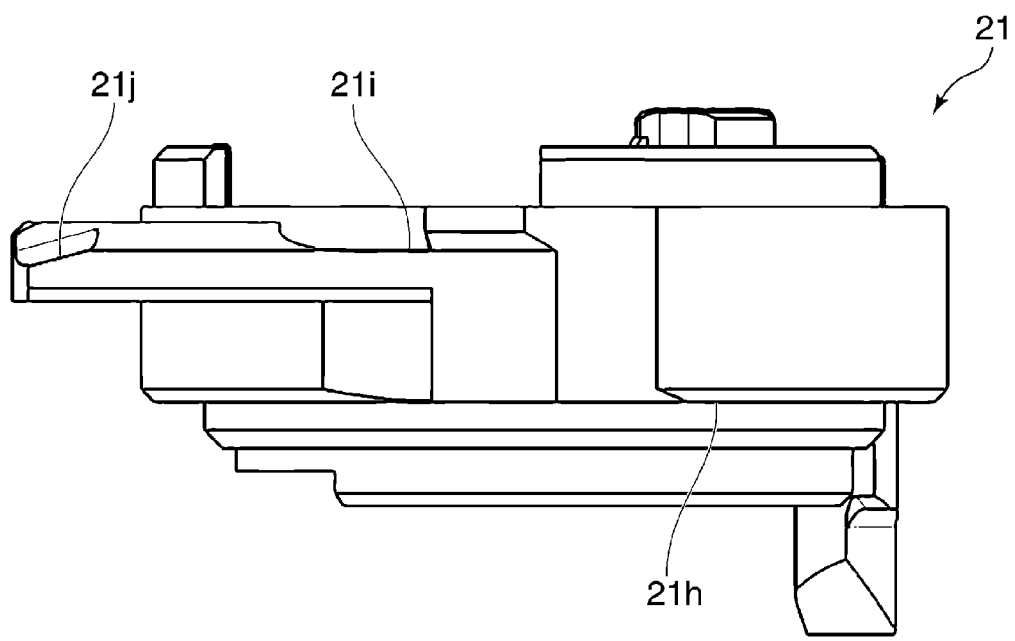
FIG. 12A is a side view of a second group holding frame.

FIG. 11 is a cross-sectional view of a second group unit 2. FIG. 12A is a side view of a second group holding frame 21, and FIG. 12B is a cross-sectional view of a second group base plate 22. It should be noted that, in the present embodiment, portions identical or corresponding to those in the first embodiment are described by being denoted by the same reference numerals and characters.

As shown in FIG. 11, in the present embodiment, regulating surfaces 21$h$ and 21$i$ are respectively provided at positions of the second group holding frame 21, which are spaced apart from each other in the optical axis A direction and which substantially face, via the optical axis A, the compression spring 23 urging the opening section 22$b$ of the second group base plate 22 in the arrow C direction (optical axis A direction).

Further, regulating surfaces 22$f$ and 22$g$ are respectively provided at positions of the second group base plate 22, the positions respectively facing the regulating surfaces 21$h$ and 21$i$ of the second group holding frame 21 in the optical axis A direction.

Further, at the photographing position, each of the subject-side and image-surface-side regulating surfaces 21$h$ and 21$i$ respectively provided at the second group holding frame 21, and each of the subject-side and image-surface-side regulating surfaces 22$f$ and 22$g$ respectively provided at the second group base plate 22 are arranged to face each other so as to be close to each other in the optical axis A direction. Thereby, the position of the second group holding frame 21 is regulated with respect to the second group base plate 22 in the optical axis A direction.

Further, as shown in FIG. 12A, a tapered surface 21$j$ is formed at the distal end of the regulating surface 21$h$ of the second group holding frame 21. By this tapered surface 21$j$, the regulating surfaces 21$h$ and 21$i$ of the second group holding frame 21 are made to easily enter between the regulating surfaces 22$f$ and 22$g$ of the second group base plate 22 at the time when the second group holding frame 21 is rotated to the photographing position.

Figure 12B:
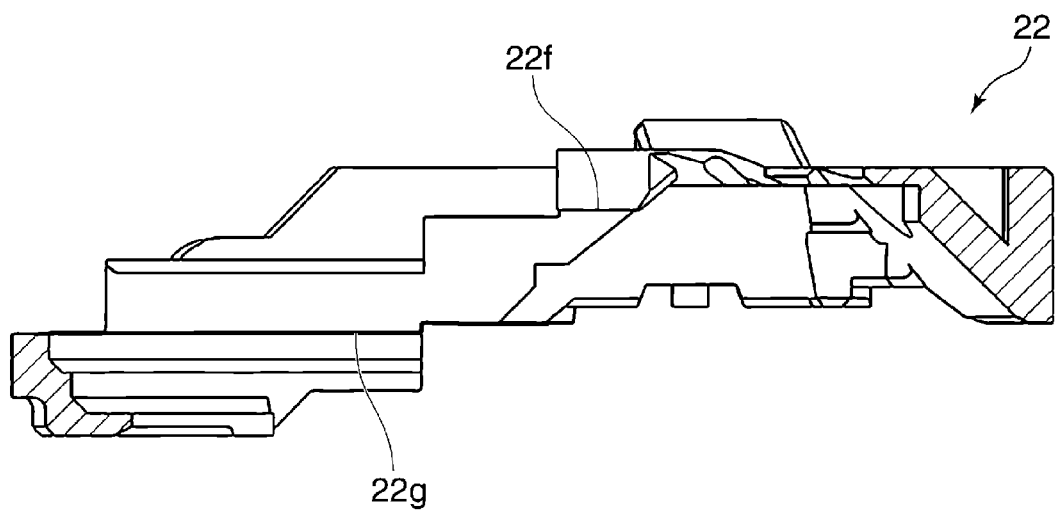
FIG. 12B is a cross-sectional view of a second group base plate.

Further, as shown in FIG. 12A and FIG. 12B, the regulating surfaces 21$h$ and 21$i$ of the second group holding frame 21 are arranged so as not to overlap each other in the optical axis A direction, and also the regulating surfaces 22$f$ and 22$g$ of the second group base plate 22 are arranged so as not to overlap each other in the optical axis A direction. When the regulating surfaces are arranged so as not to overlap each other in the optical axis A direction, it is not necessary to use a slide-type mold as a mold used at the time of molding. Therefore, the mold can be simplified as compared with the case where the positions in the optical axis A direction are regulated by the engaging groove 21$e$ and the engaging pin 22$d$.

In the present embodiment, a case is exemplified in which the subject-side regulating surfaces 21$h$ and 22$f$ are arranged opposite and close to each other in the optical axis A direction and the image-surface-side regulating surfaces 21$i$ and 22$g$ are arranged opposite and close to each other in the optical axis A direction. However, it may also be possible that the subject-side regulating surfaces 21$h$ and 22$f$ are fitted to each other and the image-surface-side regulating surfaces 21$i$ and 22$g$ are fitted to each other. The other configuration and operational advantages are the same as those in the first embodiment.

Further, the present invention is applicable to configurations such as, for example, a configuration in which the convex shape of the concave and convex engaging structure of the unit for regulating the optical-axis-A-direction position of the second group holding frame 21 in the photographing state is changed into a fitting-type ball shape instead of the pin shape, and a configuration in which the optical-axis-A-direction position is regulated by the urging force of a spring instead of the regulating surface. The configuration according to the present invention is not limited in particular.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-285168 filed Dec. 27, 2012, which is hereby incorporated by reference herein in its entirety.

What is claimed is:

1. A lens barrel comprising:
   a moving member configured to be moved along an optical axis according to a zooming operation;
   a holding member supported so as to be rotatable, via a support shaft, with respect to the moving member, in a state of holding an optical element, the holding member being configured, in a collapsed state, to be rotated in a direction retracting from the optical axis, and in a photographing state, to be rotated toward the optical axis to arrange the optical element on the optical axis;
   a first position regulating unit configured to regulate an optical-axis-direction position of the holding member with respect to the moving member by urging, in the optical axis direction, wherein a portion is supported by the moving member via the support shaft of the holding member; and a second position regulating unit configured, in the photographing state, to regulate the optical-axis-direction position of the holding member with respect to the moving member by a concave and convex engaging structure.

2. The lens barrel according to claim 1, wherein said second position regulating unit is arranged at a position facing said first position regulating unit via the optical axis.

3. The lens barrel according to claim 1, wherein a convex shape of the concave and convex engaging structure is comprised of a pin shape or a ball shape.

4. The lens barrel according to claim 1, wherein the moving member is provided with the convex shape of the concave and convex engaging structure, and the holding member is provided with a concave shape of the concave and convex engaging structure.

5. The lens barrel according to claim 1, wherein said second position regulating unit regulates the position of the holding member with respect to the moving member in the direction perpendicular to the optical axis.

6. An image pickup apparatus including a lens barrel, wherein the lens barrel is comprised of
a moving member configured to be moved in an optical axis according to a zooming operation; a holding member supported so as to be rotatable, via a support shaft, with respect to the moving member, in a state of holding an optical element, the holding member being configured, in a collapsed state, to be rotated in a direction retracting from the optical axis, and in a photographing state, to be rotated toward the optical axis to arrange the optical element on the optical axis; a first position regulating unit configured to regulate the optical-axis-direction position of the holding member with respect to the moving member by urging, in an optical axis direction, wherein a portion is supported by the moving member via the support shaft of the holding member; and a second position regulating unit configured, in the photographing state, to regulate the optical-axis-direction position of the holding member with respect to the moving member by a concave and convex engaging structure.

7. A lens barrel comprising:
a moving member configured to be moved along an optical axis according to a zooming operation;
a holding member holding an optical element configured to retract from the optical axis in a collapsed state and arrange the optical element on the optical axis in a photographing state;
a first position regulating unit configured to regulate an optical-axis-direction position of the holding member with respect to the moving member; and
a second position regulating unit configured, in the photographing state, to regulate the optical-axis-direction position of the holding member with respect to the moving member by a concave and convex engaging structure, wherein
the first position regulating unit and the second position regulating unit are located in a opposing manner with the optical axis inbetween.

8. An image pickup apparatus including a lens barrel, wherein the lens barrel is comprised of a moving member configured to be moved along an optical axis according to a zooming operation; a holding member holding an optical element configured to retract from the optical axis in a collapsed state and arrange the optical element on the optical axis in a photographing state; a first position regulating unit configured to regulate an optical-axis-direction position of the holding member with respect to the moving member; and a second position regulating unit configured, in the photographing state, to regulate the optical-axis-direction position of the holding member with respect to the moving member by a concave and convex engaging structure, wherein the first position regulating unit and the second position regulating unit are located in a opposing manner with the optical axis inbetween.

* * * * *